United States Patent [19]

Striffeler

[11] 4,200,698
[45] Apr. 29, 1980

[54] COMPOUND AND PROCESS FOR SEALING SPACES IN ELECTRICAL INSTRUMENTS

[75] Inventor: Werner Striffeler, Winterthur, Switzerland

[73] Assignee: Micafil, AG, Zurich, Switzerland

[21] Appl. No.: 32,407

[22] Filed: Apr. 23, 1979

[30] Foreign Application Priority Data

Apr. 27, 1978 [CH] Switzerland .................... 4557/78

[51] Int. Cl.$^2$ .............................................. C08J 9/30
[52] U.S. Cl. ................................ 521/120; 252/63.7;
252/66; 260/33.8 UA; 260/42.34; 427/58
[58] Field of Search .................... 260/33.8 UA, 42.34;
252/63.7, 64, 66; 427/58; 521/120

[56] References Cited

U.S. PATENT DOCUMENTS 2,902,451  9/1959  Ross .................................... 252/66
4,097,913  6/1978  Lapp et al. ........................... 252/66

Primary Examiner—Lewis T. Jacobs
Attorney, Agent, or Firm—Burns, Doane, Swecker & Mathis

[57] ABSTRACT

A compound for sealing electrical instruments comprises a bromo-terminated butadiene polymer, a liquid chlorinated hydrocarbon which functions as a solvent for the polymer, a cross-linking agent and an epoxydized cycloolefin. The sealing compound may also include inert organic filler materials and gaseous substances, the latter imparting a foam consistency and a higher degree of compressability to the compound. The process for sealing the electrical instrument preferably involves a first and second component which are mixed together to form the sealing compound before being introduced into the instrument wherein it hardens at ambient temperature.

15 Claims, No Drawings

COMPOUND AND PROCESS FOR SEALING SPACES IN ELECTRICAL INSTRUMENTS

BACKGROUND OF THE INVENTION

1. Field of the Invention

This invention relates to a compound and a process for sealing spaces in electrical instruments.

2. Description of the Prior Art

It is well known in the art to seal spaces in high voltage electrical instruments with various liquid or solid dielectric substances in order to reduce the possibility of short circuiting. However, such known substances provide substantial disadvantages which are inherent in their use. Thus, for example, if insulating oil is used as the dielectric substance, it is necessary to equip the instrument with an oil reservoir to compensate for the thermal expansion and contraction caused by both environmental and internal conditions. Moreover, the insulating oil is subject to leakage from the instrument, particularly in those instances wherein the instrument must be transported to its final site.

In an effort to remedy the problems caused by liquid dielectric substances, the art has turned to substances which, although initially introduced as a liquid, harden to a solid dielectric substance. In most instances, however, it has been found that the hardening process and/or thermal conditions within the instrument cause cracking of the solid which naturally results in degradation of the dielectric properties. Additionally, the solid consistency of the substance makes internal repair work of the instrument an extremely difficult task. In this regard, despite the use of special solvents, such as dimethylformamide, a great amount of time and energy must still be expended to accomplish the repair.

Published German patent application No. 20 50 232 describes a variation of the solid insulating material. Liquid rubber is poured into the instrument and vulcanized therein by heating the instrument. Although providing the proper insulative qualities, the relatively incompressable material exerts large pressures on the internal mechanism of the instrument upon the occurrence of higher temperatures due to its large thermal expansion coefficient. Thus, the material can only be effectively used in those situations where a thin layer of material is required or relatively small increases in temperature are experienced.

A further known technique for sealing high voltage electrical instruments involves the use of gel-like materials. Such materials have been prepared, for example, by adding thickeners, represented by silicic acid*), to the previously mentioned insulating oils. To obtain a degree of compressability, microballoons may be admixed with the thickened oil. A problem associated with this material, however, is that unless carefully controlled, the viscosity of the material is such that it is difficult to fill all the open spaces of the instrument. As can readily be appreciated, the resulting gaps adversely affect the dielectric properties of the insulating material.
*) correct is: pyrogenic silica A further example of an insulating gel-like material is disclosed in Swiss Pat. No. 526,842. The described material is prepared by adding powdery polystyrene to a chlorinated diphenyl compound at ambient temperature, introducing the mixture to the instrument and heating the entire instrument to gel the material. To impart compressability to the material a gaseous substance may be incorporated prior to introducing the material into the instrument. Although this material possesses the proper dielectric properties and is beneficially non-combustible, it requires the heating step to gel and in the event of prolonged exposure to elevated temperatures (i.e., above 90° C.) tends to liquify.

From the above description of the prior art, it should be apparent that the art has searched for a sealing compound which is relatively simple to prepare and introduce into the electrical instrument, but remains as an effective dielectric substance over a broad range of operating conditions. This invention was developed as a result of that search.

OBJECTS AND SUMMARY OF THE INVENTION

Accordingly, it is a general object of the present invention to eliminate or substantially reduce the problems of the prior art.

It is a more specific object of the present invention to provide a sealing compound for electrical instruments which may be introduced and hardened at ambient temperature.

It is another object of the present invention to provide a sealing compound possessing fire resistant and fire quenching properties.

It is yet another object of the present invention to provide a sealing compound which possesses excellent dielectric properties over a broad range of operating conditions.

It is a further object of the present invention to provide a process for sealing electrical instruments with an improved sealing compound.

These and other objects, as well as the scope, nature and utilization of the invention will be apparent to those of ordinary skill in the art from the following summary and detailed description of the preferred embodiments.

In one aspect, the present invention provides a compound for sealing electrical instruments. The compound comprises:

(a) a bromo-terminated butadiene polymer;

(b) a liquid chlorinated hydrocarbon capable of acting as a solvent for the butadiene polymer, said liquid chlorinated hydrocarbon being present in an amount ranging from about 0.3 to about 3.0 parts per part of said bromo-terminated butadiene polymer;

(c) a cross-linking agent selected from the group consisting of aliphatic polyamines and basic polyamides, said cross-linking agent being present in an amount ranging from about 0.005 to about 0.2 parts per part of the bromo-terminated butadiene polymer; and (d) an epoxydized cycloolefin in an amount ranging from about 0.001 to about 0.1 parts per part of said liquid chlorinated hydrocarbon.

In another aspect the present invention provides a process for sealing an electrical instrument. The process comprises:

(a) forming a first component comprising
 (1) a bromo-terminated butadiene polymer;
 (2) a liquid chlorinated hydrocarbon capable of acting as a solvent for the butadiene polymer, and
 (3) an epoxydized cycloolefin;
(b) forming a second component comprising
 (1) a liquid chlorinated hydrocarbon capable of acting as a solvent for the butadiene polymer, and
 (2) a cross-linking agent selected from the group consisting of aliphatic polyamines and basic polyamides;

(c) mixing said first and second component to form a mixture comprised of said bromo-terminated butadiene polymer, from about 0.3 to about 3.0 parts per part of the butadiene polymer of said liquid chlorinated hydrocarbon, from about 0.001 to about 0.1 parts per part of the liquid hydrocarbon of said expoxydized cycloolefin, and from about 0.005 to about 0.2 parts per part of the bromo-terminated butadiene polymer of said cross-linking agent;

(d) introducing the mixture into the spaces of the electrical instrument; and (e) hardening the mixture.

DESCRIPTION OF THE PREFERRED EMBODIMENTS

As stated above, the present invention relates to a compound for sealing electrical instruments. Such instruments are exemplified by circuit interrupters, switching devices, transformers and other high voltage devices requiring a dielectric material.

The sealing compound is prepared from a plurality of ingredients which may be sequentially mixed together or selectively combined to form a two-component system, the two components being mixed together prior to introduction in the electrical instrument. The sealing compound comprises:

(a) a bromo-terminated butadiene polymer;

(b) a liquid chlorinated hydrocarbon capable of acting as a solvent for the butadiene polymer;

(c) a cross-linking agent; and (d) an epoxydized cycloolefin.

The bromo-terminated butadiene polymer is selected such that it is soluble in the liquid hydrocarbon. Typically, the polymer has a relatively low molecular weight and a viscosity ranging from about 100,000 to about 200,000 mPas. at 20° C. (100 mPas. is equal to 1 Poise). The acceptable types of bromo-terminated butadiene polymers are illustrated by Polysar RTV. Other acceptable polymers and the preparation thereof are well within the scope of expertise of those familiar with this art and need not be elaborated on here.

The liquid chlorinated hydrocarbon is present in amounts ranging from about 0.3 to about 3.0 parts per part of the bromo-terminated butadiene polymer. The hydrocarbon functions as a solvent for the butadiene polymer and any monomers resulting therefrom and hence is effective in preventing exudation or phase separation even under elevated temperatures. Additionally, inasmuch as it possesses a relatively low viscosity, the hydrocarbon generally serves to reduce the viscosity of the mixture containing the butadiene polymer. The liquid chlorinated hydrocarbon is also selected such that it exhibits excellent dielectric strength. This is particularly true with chlorinated aromatic hydrocarbons such as the various isomers of trichlorodiphenyl, tetrachlorodiphenyl and mixtures thereof which also possess excellent thermal stability. Other chlorinated diphenyl compounds have not been found to be acceptable for various reasons. Thus, the mono- and dichlorodiphenyl isomers are generally too combustible to be employed, whereas the penta- and hexachlorodiphenyl isomers are too viscous to permit easy handling of the sealing compound.

In those instances where the dielectric properties are not as an important a consideration, the liquid chlorinated hydrocarbon may be a chlorinated paraffin of from about 10 to about 20 carbon atoms which possesses a chlorine content of from about 40% to about 60% by weight and viscosity of from about 100 to about 10,000 mPas. at 20° C. In this regard, it should be apparent that the term "chlorinated paraffin" also includes mixtures of chlorinated paraffin compounds as long as the overall mixtures satisfy the aforementioned criteria.

The cross-linking agent is present in an amount ranging from about 0.005 to about 0.2 parts per part of the bromo-terminated butadiene polymer and is selected such that the cross-linking of the chlorinated butadiene polymer can occur at ambient temperature (i.e., without requiring an elevated temperature) within relatively short periods of time. Cross-linking agents capable of performing this function are represented by aliphatic polyamines, such as ethylenediamine, triethylenetetramine, tetraethylenepentamine, pentaethylenehexamine, methylated pentaethylenehexamine, dimethylaminopropylamine and methyliminobispropylamine, and basic polyamides such as the reaction product of lower aliphatic amines with unsaturated fatty acids, preferably dimeric or trimeric unsaturated fatty acids, the reaction product of tall-oil with polyethylenepolyamines, preferably triethylenetetramine or the reaction product of linoleic acid with polyethylenepolyamines, preferably ethylenediamine. An additional benefit of such cross-linking agents is that due to the addition polymerization reaction, no reaction products occur which could adversely affect the characteristics of the sealing compound.

The epoxydized cycloolefin is present in amounts ranging from about 0.001 to about 0.1 parts per part of the liquid chlorinated hydrocarbon and is characterized by at least one epoxy group per molecule. The cycloolefin is present to accept any hydrogen chloride which may be produced by partial decomposition of the liquid chlorinated hydrocarbon. If permitted to accumulate, the hydrogen chloride would adversely affect the electrical properties of the sealing and would additionally tend to degrade the components of the electrical instrument.

The cycloolefin is selected such that is is soluble in the liquid chlorinated hydrocarbon, but does not substantially react with the cross-linking agent. Exemplary epoxydized cycloolefins include vinylcyclohexenedioxide, dicyclopentadiene dioxide, 2,2-bis(3,4-epoxycyclohexyl)propane and 3,4-epoxycyclohexylmethyl-(3,4-epoxy)cyclohexane carboxylate.

Depending on the degree of chlorination of the liquid chlorinated hydrocarbon, the sealing compound may possess adequate fire resistant and self-quenching properties, even in the presence of combustible organic polymers which typically form various components of the electrical instrument. To further improve the thermal properties of the sealing compound, however, from about 0.01 to about 0.3 parts per part of the bromo-terminated butadiene polymer of antimony trioxide may be incorporated into the compound.

The sealing compound may also include from about 0.3 to about 3.0 parts per part of the bromo-terminated butadiene polymer of known inert inorganic filler materials. Such fillers are represented by silica flour, microdolomite, chalk, aluminum oxide, and calcium carbonate. Of course, where desired, mixtures of the fillers may also be employed. Preferably, the inorganic fillers are incorporated in fine particulate form to preclude the possibility of excessive sedimentation.

To impart a degree of compressability to the sealing compound up to about 50% by volume of the compound of a gaseous substance can be optionally incorporated therein. Naturally, a higher gas content will result in a high degree of compressability, and thus a low pressure rise within the sealing compound upon the occurrence of elevated temperatures. In this situation, however, a lower dielectric strength will result. Conversely, with smaller quantities of the gaseous substance present, lower compressability, but higher dielectric strength, will be obtained.

In order to obtain optimum dielectric properties, the gaseous substance is generally well dispersed in the sealing compound such that the diameter of the bubbles is less than about 0.5 mm. Although various gaseous substances may be selected depending on the desired dielectric properties, exemplary materials include air, carbon dioxide and, more preferably, nitrogen and sulfur hexafluoride.

The sealing compound may be prepared in either of two processes. In the first process, the bromo-terminated butadiene polymer, liquid chlorinated hydrocarbon, epoxydized cycloolefin and, if desired, the inert inorganic filler are thoroughly mixed together and preferably subjected to reduced pressure to remove any entrained air. To the mixture is added the cross-linking agent and, if desired, the gaseous substance. The thusly formed sealing compound is then introduced into the electrical instrument where it hardens at ambient temperature.

Alternatively and more preferably, the sealing compound is prepared from a first component and a second component. The first component is comprised of the bromo-terminated butadiene polymer, the liquid chlorinated hydrocarbon, the epoxydized cycloolefin and, if desired, the inert inorganic filler material.

The second component is characterized as the hardener component and is comprised of the cross-linking agent and, optionally, additional liquid chlorinated hydrocarbon which may be the same or different as the hydrocarbon employed in the first component.

The amount of liquid chlorinated hydrocarbon in each of the components may vary within wide ranges, but is generally selected such that it functions as an effective solvent for the soluble ingredients. In all instances, however, the total amount of liquid chlorinated hydrocarbon falls within the range prescribed above.

The first and second components are next mixed together. Although any known means of obtaining a homogenous mixture may be employed, it is preferred to use a static mixing tube into which is introduced the first component, the second component, and, optionally, the gaseous substance. Alternatively, the first and second components may simply be mixed together and the gaseous substance added thereafter. In either situation, the prepared sealing compound is then added to the electrical instrument wherein it hardens at ambient temperature.

As mentioned above, particularly advantageous results may be obtained by employing a weight ratio of bromo-terminated butadiene polymer to liquid chlorinated hydrocarbon to inert inorganic filler material in the range of from about 1.0:0.3:0.3 to about 1.0:3.0:3.0. This range yields the additional advantage that the viscosity of the overall mixture is readily capable of being handled by conventional devices (i.e., mixing and pumping units), but does not permit a substantial amount of any dispersed gaseous substance from escaping.

The hardening period for the sealing compound may vary within wide ranges depending on the type and amount of the selected constituents. Thus, for example, the hardening period will generally increase as the proportion of the liquid chlorinated hydrocarbon and the inert inorganic filler material increases. In general, however, hardening will be completed after about 24 hours and the compound will be fully developed after about 48 hours. To preclude a possible reduction in dielectric strength, it is preferable to allow the compound to harden in the substantial absence of air and moisture.

The sealing compound of the present invention is characterized by excellent dielectric strength and thermal properties. In this latter regard, the sealing compound does not degrade or exert substantial pressures under prolonged exposure to elevated temperatures and does not support combustion when exposed to open flames even in the presence of combustible materials.

The following Examples are given as specific illustrations of the present invention. It is to be understood, however, that the invention is not limited to the specific details set forth in the Examples. Unless otherwise indicated, the term "parts", wherever used in the specification, refers to parts by weight.

EXAMPLE 1

(A) Polymer component:

100 parts of a bromo-terminated butadiene polymer possessing a viscosity of approximately $2.0 \times 10^5$ mPas. at 20° C., is dissolved in a mixture containing 90 parts of trichlorodiphenyl and 1 part of vinylcyclohexenedioxide and stirred at room temperature. 100 parts of precipitated calcium carbonate and 10 parts of antimony trioxide are then added, and this mixture is homogenized.

(B) Hardener component:

The hardener component is obtained by dissolving 5 parts of methylated pentaethylenehexamine (PEHA) in 55 parts of trichlorodiphenyl.

Components A and B are mixed together and the resulting sealing compound is treated with 15 percent by volume of nitrogen gas, whereby 5 parts of the methylated PEHA is apportioned to 100 parts of the butadiene polymer. The sealing compound possesses the following characteristics after hardening for 48 hours at room temperature:

| | |
|---|---|
| Pressure rise at constant volume at an increase in temperature from 20° to 90° C. | approx. 0.4 bar |
| Dielectric strength of the gas-treated compound measured at 20° C., ball/ball, d = 3 mm., | 23 kV. |
| Dielectric strength of the gas-free mass, measured at 20° C., ball/ball, d = 3 mm., used as a comparative value | 70 kV. |
| Dielectric loss factor at 20° C., 50 Hz. at 90° C., 50 Hz. | tg 0.02 tg 0.08 |
| Combustibility of the sealing compound | self-quenching |

EXAMPLE 2

100 parts of the bromo-terminated butadiene polymer specified in Example 1 is dissolved in 120 parts of a chlorinated n-paraffin with a chlorine content of approximately 40 percent by weight and a viscosity of approximately 100 mPas. at 20° C. 2 parts of vinylcyclohexenedioxide, 30 parts of a calcium carbonate and 10 parts of antimony trioxide are added to the mixture which is then homogenized. After the removal of the stirred-in air by a brief evacuation, there is added 5 parts of methylated pentaethylenehexamine (PEHA) and the mass is then treated with 20 percent by volume of nitrogen. Hardening is accomplished with the exclusion of air and moisture. The sealing compound possesses the following characteristics after a hardening period of 48 hours at room temperature:

| | |
|---|---|
| Pressure rise at constant volume at an increase in temperature from 20° to 90° C. | approx. 0.3 bar |
| Dielectric strength of the gas-treated compound measured at 20° C., ball/ball, d = 3 mm. | 16 kV. |
| Dielectric strength of the gas-free mass, measured at 20° C., ball/ball, d = 3 mm. | 60 kV. |
| Dielectric loss factor at 20° C., 50 Hz. | tg 0.07 to 0.1 |
| Combustibility of the sealing compound | self-quenching |

Although the invention has been described with preferred embodiments, it is to be understood that variations and modifications may be resorted to as will be apparent to those skilled in the art. Such variations are to be considered within the scope of the following claims.

I claim:

1. A compound for sealing spaces in electrical instruments comprising:
   (a) a bromo-terminated butadiene polymer;
   (b) a liquid chlorinated hydrocarbon capable of acting as a solvent for the butadiene polymer, said liquid chlorinated hydrocarbon being present in an amount ranging from about 0.3 to about 3.0 parts per part of said bromo-terminated butadiene polymer;
   (c) a cross-linking agent selected from the group consisting of aliphatic polyamines and basic polyamides, said cross-linking agent being present in an amount ranging from about 0.005 to about 0.2 parts per part of the bromo-terminated butadiene polymer; and
   (d) an epoxydized cycloolefin in an amount ranging from about 0.001 to about 0.1 parts per part of said liquid chlorinated hydrocarbon.

2. The sealing compound of claim 1 wherein the liquid chlorinated hydrocarbon comprises a chlorinated paraffin of from about 10 to about 20 carbon atoms, said chlorinated paraffin having a chlorine content of from about 40 to about 60% by weight and a viscosity of from about 100 to about 10,000 mPas.

3. The sealing compound of claim 1 wherein the liquid chlorinated hydrocarbon comprises a chlorinated aromatic hydrocarbon selected from the group consisting of trichlorodiphenyl, tetrachlorodiphenyl and mixtures thereof.

4. The sealing compound of claim 1 wherein the epoxydized cycloolefin is vinylcyclohexenedioxide.

5. The sealing compound of claim 1 wherein there is present from about 0.3 to about 3.0 parts per part of the bromo-terminated butadiene polymer of an inert inorganic filler material.

6. The sealing compound of claim 5 wherein the inert inorganic filler material is selected from the group consisting of silica flour, microdolomite, chalk, aluminum oxide, calcium carbonate and mixtures thereof.

7. The sealing compound of claim 1 wherein there is present up to about 50% by volume of a dispersed inert gaseous substance.

8. The sealing compound of claim 7 wherein the gaseous substance is selected from the group consisting of air, nitrogen, carbon dioxide and sulfur hexafluoride.

9. The sealing compound of claim 1 wherein there is present from about 0.01 to about 0.3 parts per part of said bromo-terminated butadiene polymer of antimony trioxide.

10. The sealing compound of claim 1 wherein the cross-linking agent is methylated pentaethylenehexamine.

11. A process for sealing spaces in an electrical instrument comprising:
    (a) forming a first component comprising
       (1) a bromo-terminated butadiene polymer;
       (2) a liquid chlorinated hydrocarbon capable of acting as a solvent for the butadiene polymer, and
       (3) an epoxydized cycloolefin;
    (b) forming a second component comprising
       (1) a liquid chlorinated hydrocarbon capable of acting as a solvent for the butadiene polymer, and
       (2) a cross-linking agent selected from the group consisting of aliphatic polyamines and/or basic polyamides;
    (c) mixing said first and second components to form a mixture of said bromo-terminated butadiene polymer, from about 0.3 to about 3.0 parts per part of the butadiene polymer of said liquid chlorinated hydrocarbon, from about 0.001 to about 0.1 part per part of the liquid hydrocarbon of said epoxydized cycloolefin, and from about 0.005 to about 0.2 parts per part of the bromo-terminated butadiene polymer of said cross-linking agent;
    (d) introducing the mixture into the spaces of the electrical instrument; and
    (e) hardening the mixture.

12. The process of claim 11 wherein said first component further comprises an inert inorganic filler material selected from the group consisting of silica flour, microdolomite, chalk, aluminum oxide, calcium carbonate and mixtures thereof, the filler material being present in an amount ranging from about 0.3 to about 3.0 parts per part of the bromo-terminated butadiene polymer.

13. The process of claim 11 wherein the mixture further comprises up to about 50% by volume of a dispersed inert gaseous substance selected from the group consisting of air, nitrogen, carbon dioxide and sulfur hexafluoride.

14. The process of claim 13 wherein the epoxydized cycloolefin is vinylcyclohexenedioxide.

15. The process of claim 14 wherein the cross-linking agent is methylated pentaethylenehexamine.

* * * * *